Oct. 26, 1954   J. H. CLARK   2,692,937
BEVERAGE BREWER
Filed Oct. 25, 1946   3 Sheets-Sheet 1
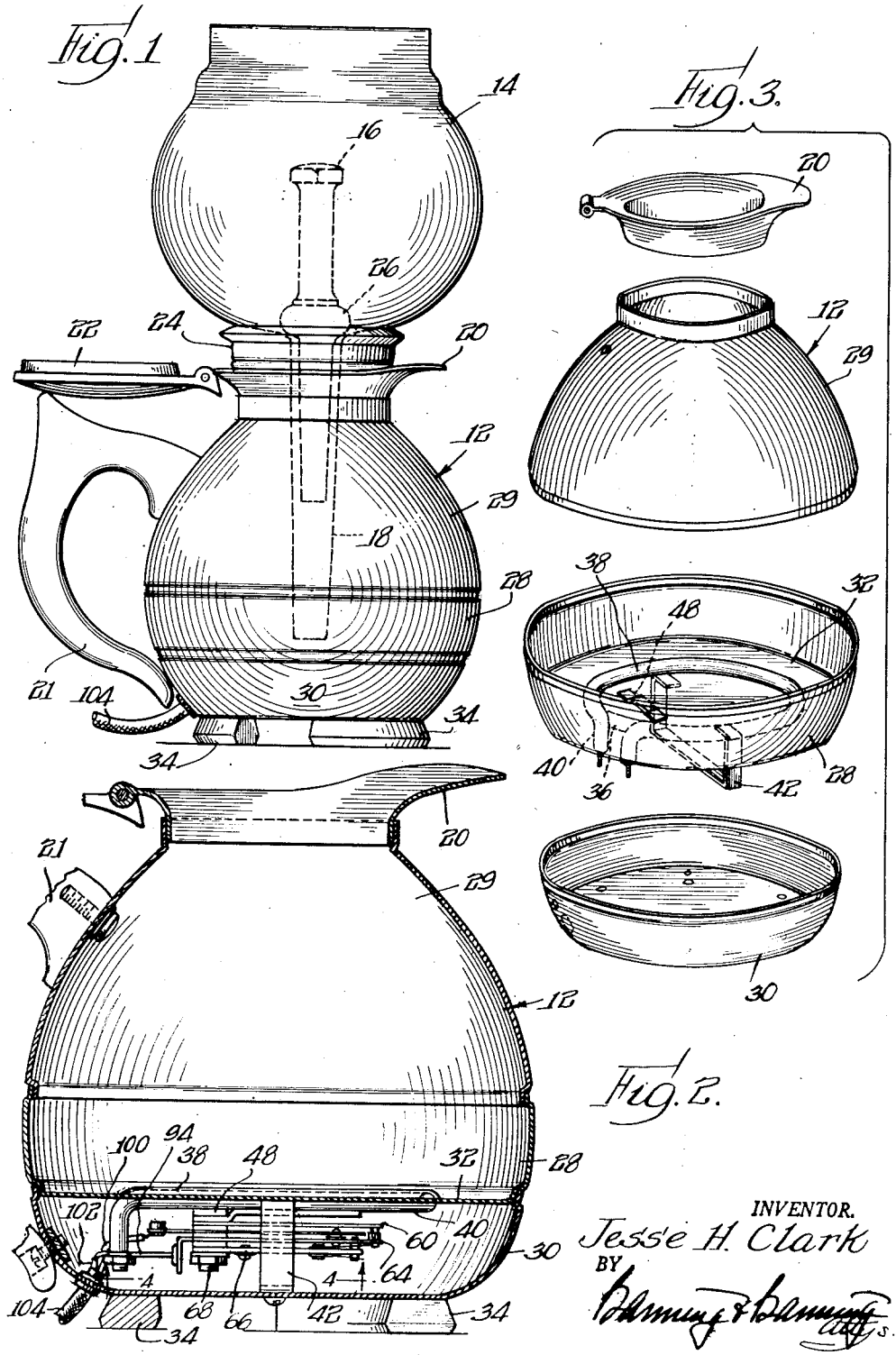
INVENTOR.
Jesse H. Clark Oct. 26, 1954
J. H. CLARK
2,692,937
BEVERAGE BREWER
Filed Oct. 25, 1946
3 Sheets-Sheet 2
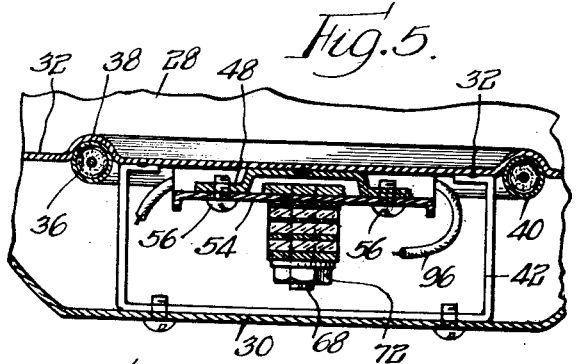
Fig. 5.
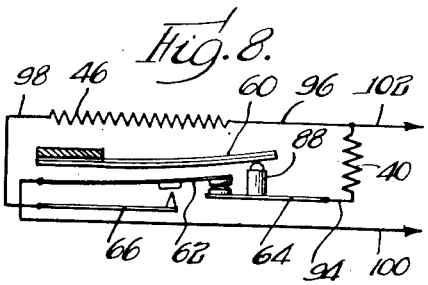
Fig. 8.
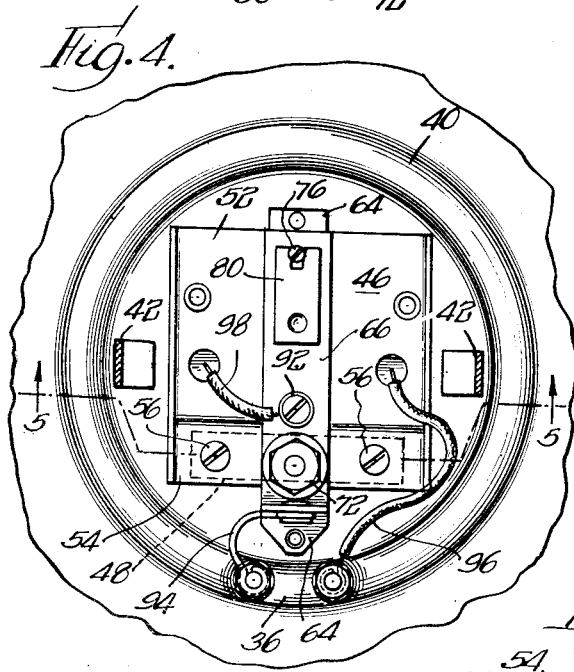
Fig. 4.
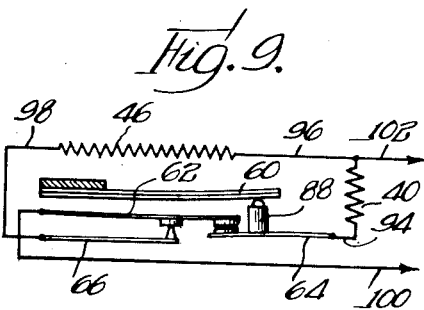
Fig. 9.
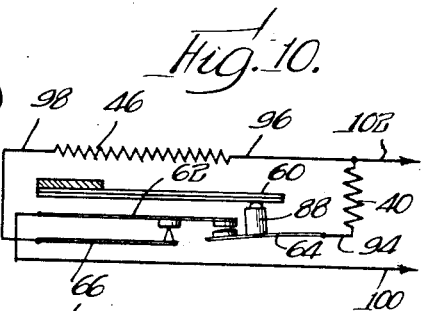
Fig. 10.
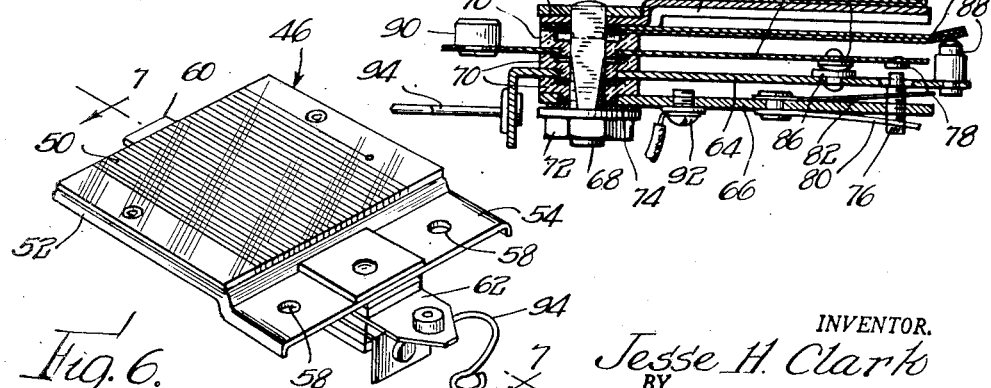
Fig. 7.
Fig. 6.
INVENTOR.
Jesse H. Clark
BY
*[signature]*
ATTYS.

Oct. 26, 1954
J. H. CLARK
2,692,937
BEVERAGE BREWER
Filed Oct. 25, 1946
3 Sheets-Sheet 3
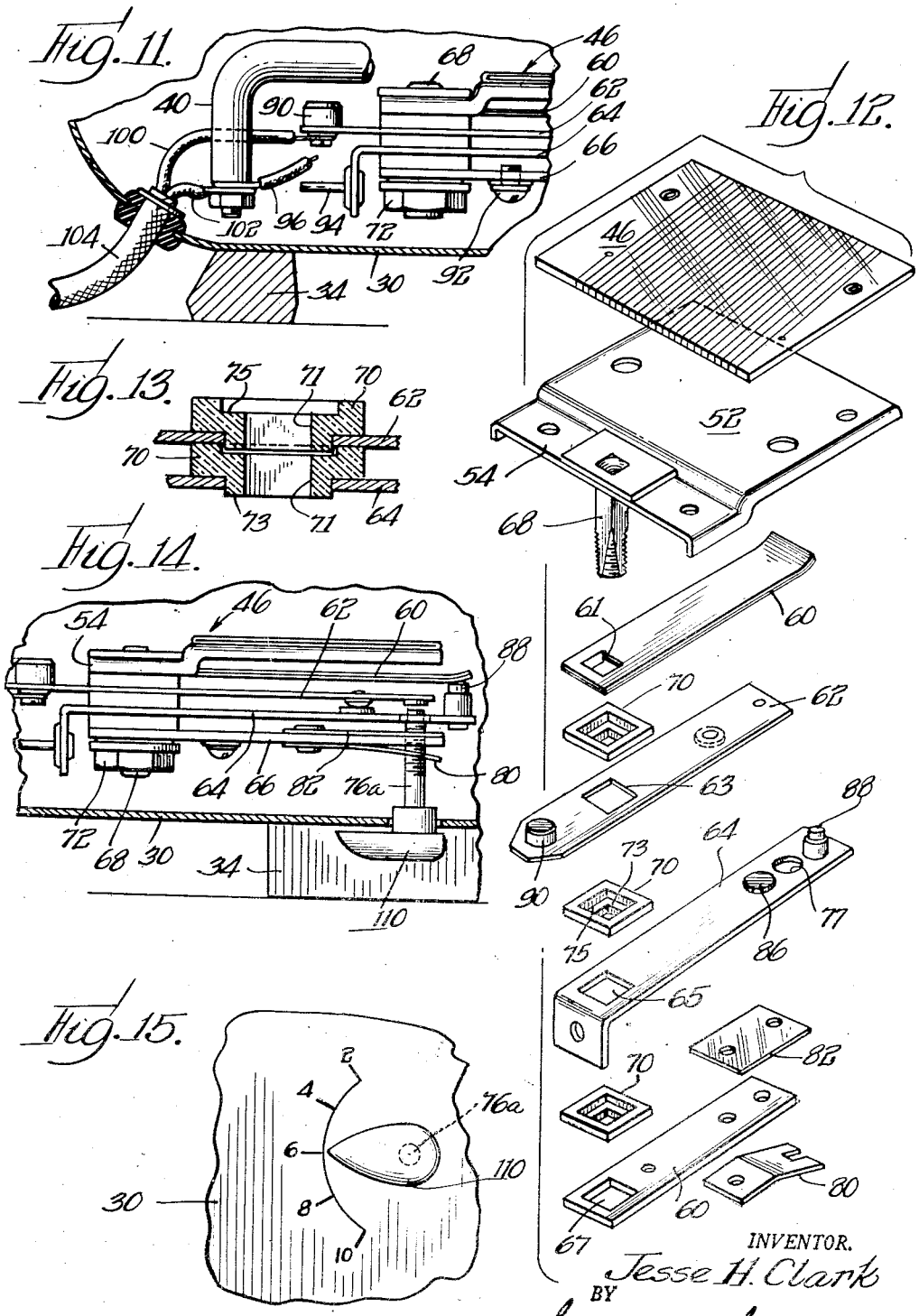
INVENTOR.
Jesse H. Clark
BY Patented Oct. 26, 1954

2,692,937

UNITED STATES PATENT OFFICE 2,692,937

BEVERAGE BREWER

Jesse H. Clark, Chicago, Ill., assignor to Cory Corporation, Chicago, Ill., a corporation of Delaware Application October 25, 1946, Serial No. 705,546

4 Claims. (Cl. 219—44)

1

This invention relates to heating devices, and particularly to automatic, electrically operated beverage brewers.

A general object of this invention is to provide an improved, completely automatic beverage brewer of the vacuum type.

In the brewing of beverages such as coffee certain requirements should be fulfilled for best results. Fundamental requirements for making good coffee are:

1. The maximum temperature of the heated water in contact with the coffee should be around 203° F.

2. The hot water should remain in contact with the coffee for about two minutes, more or less.

3. The coffee infusion then should be returned to the normal serving temperature of from 165° to 190° F. and maintained there until used.

Specifically, it is an object of the invention to provide a coffee brewer which automatically performs all of the steps involved in the above described method of making coffee.

A further object is to provide an improved, vacuum type beverage brewer with a built-in electric heating unit having a high heat element, a low heat element, and a thermal switch, all of these parts being so constituted and arranged that initially the high heat element functions to heat the water in the lower vessel rapidly for transferring the water to the upper container where it comes in contact with the coffee or other solid ingredient, the water then being maintained in the upper container of the brewer for a predetermined time until the thermal switch becomes heated by the high heat element to such an extent that it functions to energize the low heat element and deenergize the high heat element, whereupon the infusion or brew is withdrawn from the upper container by partial vacuum into the lower vessel and thereafter is maintained at serving temperature by the low heat element until used.

A still further object is to adapt the low heat element for maintaining the thermal switch heated to an extent sufficient to prevent re-energization of the high heat element, without boiling the liquid, so long as the brewer is functioning to keep the brew warm.

Still another object is to render the brewer completely automatic so that the only manual operation required, insofar as the heating control is concerned, is to plug the brewer into an electrical outlet or otherwise connect it to a source of electricity. In the so-called automatic brewers of the present day it is necessary to throw a switch or perform a similar manual operation to condition the heat control device for each cycle of operation. The present invention has the advantage that the brewer will automatically maintain itself in a low heat condition for keeping a freshly prepared quantity of beverage warm so long as the brewer is connected to the source of electricity, or even though it is for a short time disconnected from the source and then reconnected thereto, while on the other hand the brewer automatically conditions itself for recycling through high heat and low heat if it is disconnected from the electrical source for a longer time.

An additional object is to construct the brewer so that it is protected from damage which otherwise might occur if it should run dry while in operation or be plugged in when no water is present therein.

A still further object is to provide an automatic beverage brewer of the aforesaid character which is of simple and economical construction, accurate in its operation and highly dependable in service.

Various other objects, advantages and features of the invention will be apparent from the following specification when taken in connection with the accompanying drawings wherein certain preferred embodiments are set forth for purposes of illustration.

In the drawings, wherein like reference numerals refer to like parts throughout:

Fig. 1 is a view in elevation of a coffee brewer constructed in accordance with and embodying the principles of this invention;

Fig. 2 is a view in vertical section of the lower vessel of the coffee brewer;

Fig. 3 is an exploded perspective view of the lower vessel;

Fig. 4 is a cross-sectional view taken on the line 4—4 in Fig. 2 and showing the heaters and heat control subassembly;

Fig. 5 is a sectional view taken on the line 5—5 in Fig. 4;

Fig. 6 is a perspective view of the low heat element and a portion of the thermal switch;

Fig. 7 is a sectional view taken on the line 7—7 in Fig. 6;

Figs. 8, 9 and 10 are schematic views of the switch in three different operating positions;

Fig. 11 is a fragmentary sectional view, drawn to a larger scale, of a portion of the structure shown in Fig. 2;

Fig. 12 is an exploded perspective view of certain switch details;

Fig. 13 is a fragmentary sectional view, drawn to an enlarged scale, of a portion of the structure shown in Fig. 7;

Fig. 14 is a fragmentary view, in vertical section, of a modified form of thermal switch; and Fig. 15 is a bottom view of a manual adjusting device included in the modification of Fig. 14.

A coffee brewer illustrative of the invention is shown in Fig. 1, this brewer comprising a lower vessel 12, an upper container 14, and a filtering device 16. The upper container 14 is a substantially funnel-shaped member, preferably of glass, having a depending tube 18 which extends into the vessel 12. A filtering device 16 of any suitable type such as a glass filter rod is seated in the container 14 and depends into the passageway in the tube 18. The vessel 12 is composed of any suitable material such as copper and has a pouring lip 20, a heat-insulating handle 21, and a hinged lid or cover 22 which is swung back when the container 14 is mounted on the vessel 12. A suitable sealing device such as a gasket 24 of rubber (natural or otherwise) is fitted on the container 14 around a well above the tube 18. The filtering device 16 has an enlarged strainer portion 26 usually provided with a roughened or stippled surface and adapted to seat over the upper end of tube 18.

The vessel 12, as shown in Fig. 3, has a dish-like lower section 28 which is secured to the body 29 of the vessel in any suitable manner, preferably by means of a solder having a high melting point which is unaffected by the heat that may be developed. A hollow base 30 is connected by a bracket 42 to the bottom wall 32 of the lower section 28, as will be explained in detail subsequently, so as to enclose the heating elements and the thermal switch that are mounted on the under side of the wall 32. Feet 34 of heat-insulating material such as plastic are attached to the bottom of the base 30 to support the coffee brewer. The vessel 12 has an attractive finish such as chromium plating on the exterior surface thereof and a non-corrosive finish such as silver plating on its interior surface which contacts the liquid.

The bottom wall 32 of the vessel 12 is pressed or embossed to provide an annular groove 36 in one side, such as the under side, of the wall 32, Figs. 3 and 4, and a corresponding annular protuberance 38 on the other or upper side of the wall 32. A sheathed high heat element 40, Fig. 5, of a conventional type is disposed in the groove 36 where it is maintained in intimate heat transfer relation with the wall 32. Such an element generally is sealed in a metal tube which, in this instance, is permanently bonded to the wall 32. The heating element 40 projects above the flat portion of the bottom wall 32, but is a substantial distance below the lower end of tube 18, Fig. 1. The bracket 42, Figs. 3 and 5, is brazed or otherwise secured to the under side of the wall 32, and the base 30 is attached to this bracket.

A low heat element 46, Fig. 6, is supported adjacent the bottom wall 32 on the underside thereof by a bracket 48, Figs. 3 and 5, which is brazed to the wall 32. The low heat element 46 is in the form of a flat, wire-wound resistor 50 covered by a suitable insulating material such as mica and mounted on a plate 52 having an offset end portion 54. Screws 56, Fig. 5, are passed through openings 58, Fig. 6, in the offset end portion 54 and are threaded into tapped holes in the bracket 48 to hold the low heat element 46 in place adjacent the heat conducting wall 32 of the vessel 12.

The thermal switch which controls energization of both the low heat element 46 and the high heat element 40 is carried by the plate 52 on which the low heat element 46 is mounted. This switch comprises a bimetallic strip 60, Figs. 7 and 12, anchored at one end thereof to the offset end 54 of the plate 52, and an associated contact pile adapted to be actuated by the strip 60 as the latter heats and cools. Three contact blades 62, 64 and 66 are mounted in parallel relation beneath the bimetallic strip 60, as viewed in Fig. 7, all of these contact blades being anchored at one end thereof by a member 68 such as a stud which passes alternately through openings in the contact blades and insulating spacers 70 separating the blades. The member 68 extends through the strip 60 and is threaded in the end portion 54 of plate 52. A nut 72 is threaded on the opposite end of the stud 68, an insulating washer 74 being provided to maintain the nut 72 out of electrical contact with the blade 66. The end of the stud 68 is staked to secure the switch assembly on the mounting plate 52.

As shown more clearly in Fig. 12, the stud 68 is of square cross-section and is received in a square opening 61 in the strip 60. The spacers 70 have square openings 71, Fig. 13, through which the stud 68 passes. Each spacer 70 has a square recess 75 in one face thereof and a square boss 73 on its opposite face. The bosses 73 respectively fit into square apertures 63, 65 and 67 in the contact blades 62, 64 and 66. The bosses 73 which project through the blades 62 and 64 interlock with the recesses 75 in the adjoining spacers 70. The boss 73 which fits in the hole 67 comes flush with the lower face of blade 66. Because of this construction, the switch blades and bimetallic strip are solidly anchored and prevented from shifting out of alignment while being effectively insulated from each other.

The contact blade 66 is relatively rigid and has a threaded hole through which a small adjustable contact screw 76 is extended. The screw 76 passes through a large opening 77 in the contact blade 64 and is adapted to cooperate with a contact 78 on the blade 62 when the thermal switch is in low heat position. A tension spring 80 on the blade 66 takes up the slack in the proper direction and prevents the screw 76 from turning except when being adjusted. A leaf 82 of mica or other insulating material attached to the blade 66 prevents blade 64 from coming into electrical contact with the blade 66. Contact blades 62 and 64 both are resilient but blade 64 is stiffer than blade 62. Contacts 84 and 86, respectively mounted on the blades 62 and 64, normally are engaged when the bimetallic strip 60 is at ambient temperature, and when the contacts 84 and 86 are so engaged, the contact blade 64 is effective to deflect the blade 62 so that contact 78 carried thereby cannot engage the contact screw 76. An insulating stud 88 carried by the free end of the blade 64 bears against the strip 60 so that movement of the bimetallic strip 60 when it is heated may be imparted to the blade 64.

Suitable terminals 90 and 92 are provided on the blades 62 and 66, respectively, for making electrical connections to these blades, as will be described presently. A lead 94, Fig. 4, secured to the contact blade 64 connects the blade 64 to one terminal of the high heat element 40. A lead 96 connects the other end of the element 40 to one end of the winding of the low heat element 46. The other end of the winding of the low heat element 46 is connected by a lead 98 to the terminal 92 on the contact blade 66.

The operation of the brewer will be described with particular reference to Figs. 8, 9 and 10 which schematically represent the heater and heat control subassembly in simplified form for convenience. To clarify the illustration of the switch parts, contact blade 64 is shown in these views as extending in a direction opposite to that of the contact blades 62 and 66, although it will be understood that actually the preferred construction is as shown in Fig. 7. The blade 62 is connected by a suitable conductor 100, Fig. 8, to one side of the source of electricity, while the other side of this source is connected by a conductor 102 to one end of each of the heat elements 40 and 46. The remaining electrical connections shown in these views have been described hereinabove. The conductors 100 and 102 are included in an electric cord 104, separable or otherwise, Figs. 1 and 11, which connects the brewer to an electrical source.

The ambient-temperature condition of the thermal switch is depicted in Fig. 8 wherein the blades 62 and 64 (that is, the cooperating contacts carried by these blades) are engaged, and the blades 62 and 66 (that is, the cooperating contacts carried by these blades) are maintained out of engagement due to the blade 64 urging the more flexible blade 62 away from the blade 66. These are the positions which would be occupied by the parts prior to plugging the brewer into the electrical outlet, that is, when the vessel is at room temperature. The desired amount of water is placed in the vessel 12, Fig. 1, and the container 14 then is placed on the vessel 12, pressure being applied downwardly for sealing the container in place. The finely ground coffee or other dry ingredient is placed in the container 14, in which the filtering device 16 is mounted as shown. The brewer is plugged in, causing a current to flow through the conductor 100, Fig. 8, contact blades 62 and 64, high heat element 40, and conductor 102 back to source.

The element 40 draws a considerable amount of electrical power, say 800 watts, for rapidly heating the water in the vessel 12. Air expansion in the space above the water in the vessel 12, forces heated liquid from the vessel 12 up through the tube 18 and past the strainer 26 into the container 14 where it mixes with the coffee. When the level of the water in the vessel 12 drops to or below the lower end of the tube 18, the escaping steam bubbles up through the brew in the container 14 to agitate the mix and maintain it at a proper brewing temperature of around 203 degrees F.

The bimetallic strip 60 is described herein as "bending" in response to heat from the heating elements. By this is meant the flexure of the strip 60 which takes place as its temperature rises above the ambient temperature. Preferably the strip 60, when cool, is substantially straight with a slight bend at the free end thereof, Figs. 7 and 12. Conceivably, however, the strip 60 could have an initial curl or bend in it so that the strip tends to straighten when heated.

The thermal switch is so constructed that all-metallic heat paths are afforded from both the high heat element 40 and the low heat element 46 to the bimetallic strip 60, enabling heat to be transferred to the strip 60 by direct conduction as well as by radiation from the heat elements. Initially, the high heat element 40 alone is energized. The strip 60 bends as its temperature rises, and in so doing, the strip 60 bears against the insulating stud 88 and bends the contact blade 64. Contact blade 62 follows the blade 64 for a limited distance until blade 62 is arrested by engagement of its contact 78 with the adjustable contact screw 76 on the fixed contact blade 66. Contact 76 is adjusted so that this occurs when the mix has been brewing in the upper container 14 for approximately two minutes. Thus, as shown in Fig. 9, there is a period of overlap in which both sets of contacts are closed so that both of the heating elements 40 and 46 are energized, causing an increase in the rate at which the bimetallic strip 60 is being heated due to the additional heat of the low heat element 46. This produces a more rapid bending of the strip 60 so as to quickly separate the contacts 84 and 86 on the blades 62 and 64, respectively, thereby preserving the life of these contacts.

Separation of the contact blades 62 and 64, while the blades 62 and 66 remain engaged as shown in Fig. 10, occurs approximately at the time when the coffee infusion is to be returned from the container 14 to the vessel 12, causing the high heat element 40 to be deenergized while the low heat element 46 remains energized. The low heat element 46 draws a small amount of power such as 30 watts. The heat from the low heat element 46, alone, is not sufficient to maintain the body of liquid in the container 14 of the brewer nor to boil the liquid after its return to the lower vessel 12. However, the low heat element 46, because of its proximity to the bimetallic strip 60, is able to maintain the strip 60 bent so that the switch remains in the low heat condition illustrated in Fig. 10. Contraction of air and water vapor in the vessel 12 reduces the pressure within the vessel to effect rapid withdrawal of the water infusion from the container 14 past the strainer 26 and into the vessel. Thereafter the low heat element 46 continues to keep the bimetallic strip 60 bent and also serves to maintain the brew in the vessel 12 at a serving temperature of between 165 and 190 degrees F.

Thus, the brewer functions to prepare the beverage automatically in accordance with the method that produces beverage of highest quality. After the brew has been drawn from the container 14, the container 14 may be removed from the vessel 12 and the cover 22 swung to its closed position until the beverage is served. When pouring the beverage, the cover 22 is swung back to protect the hand of the server from hot vapor.

So long as the brewer remains plugged into the electric outlet following preparation of the beverage, the thermal switch will remain in the position thereof shown in Fig. 10 without reestablishing the high heat circuit. This likewise is true if the brewer is disconnected from the source of electricity and reconnected after a short interval while the warm beverage is still in the vessel. If a long interval should elapse after breaking the low heat circuit before the brewer is again plugged into the line, and the vessel still contains warm beverage, the high heat element 40 may be energized momentarily, but the thermal switch will change over to low heat without permitting the beverage to boil. It is only when the vessel returns to room temperature that the thermal switch will permit a complete new brewing cycle to take place as described above.

In the thermal switch illustrated in Fig. 7 the adjusting screw 76 is set at the factory for satisfactory operation. It may be preferred to provide a manual adjustment whereby the user can vary the setting of the contact screw for this purpose. The modification shown in Figs. 14 and 15 enables this to be accomplished. As there illustrated, the contact screw 76a is extended, and a knob 110 of Bakelite or other suitable material is attached to the shank of this screw. The knob 110 is disposed beneath the base 30 of the brewer and cooperates with suitable indicia marked on the adjoining wall of the base 30 to facilitate selection of the proper setting of the contact screw 76a for best results.

It is apparent from the foregoing description that I have provided a domestic beverage brewer having numerous outstanding advantages. The apparatus is completely automatic in its operation, functioning to bring the water in the vessel rapidly to the correct brewing temperature for making the infusion, maintaining the heated water in contact with the coffee or other ingredient for the recommended amount of time, returning the brew to the vessel and maintaining the brew heated to the proper serving temperature indefinitely until used. If the brewer is disconnected from the electric outlet and plugged in again while the brew is still warm, the thermal control prevents the brew from boiling yet enables the heating elements to operate for restoring the brew to serving temperature. When the vessel is restored to room temperature, the thermal control automatically conditions itself for application of high heat and low heat in the normal cycle as the brewer is again connected to the source of electricity. Operation of the brewer while dry does not injure it because the switch automatically cuts out the high heat element before any damage is done and places the brewer on low heat, which cannot harm it.

The brewer is highly dependable, having only negligible variation from normal operation even under widely divergent conditions as to water and room temperatures and air pressure. Excellent heat efficiency is afforded by the construction and arrangement of the vessel and heating devices, such as by permanently disposing the high heat element in a groove in the bottom of the vessel, which is of highly heat-conductive material, and mounting the low heat element in proximity to the bottom of the vessel. The bimetallic strip 60 has metallic connections to both the high heat and low heat elements for good heat conductivity. The built-in heating unit efficiently heats and adds stability to the vessel.

The modification illustrated in Figs. 14 and 15 enables the brewer to be adjusted by the user. It could also be adopted for other purposes if so desired.

The invention also has utility in other applications where sequential high heat and low heat operations are required. An instance of such use would be warming an infant's nursing bottle, where it is desired to heat the contents rapidly and then maintain the same in a warm condition until used, without the necessity of continually watching the bottle as it is heated.

A further advantage of this invention is that the thermal switch makes and breaks electrical contact only once in each brewing cycle. Recurrent opening and closing of an electrical circuit, such as is common in many thermostatic devices, is eliminated herein. This does away with undesirable radio interference and other disturbances as well as prolonging the useful life of the switch.

It is obvious that various changes may be made in the specific embodiments set forth for purposes of illustration without departing from the spirit of the invention. The invention is accordingly not to be limited to the specific embodiments shown and described, but only as indicated in the following claims.

I claim:

1. In a beverage brewer, a vessel having a plane bottom wall provided in its lower face with a shallow annular groove and a corresponding annular protuberance on its upper face, and a heat element disposed in said groove and located partially above and partially below the plane of the bottom wall of the vessel.

2. In a beverage brewer, a vessel having a plane bottom wall provided in its lower face with a shallow annular groove and a corresponding annular protuberance on its upper face, a high heat element disposed in said groove and located partially above and partially below the plane of the bottom wall of the vessel, and a low heat element consisting of a flat, wire-wound resistor located contiguous to the lower face of the bottom of the vessel and arranged within the space defined by the annular high heat element.

3. In a beverage brewer, a vessel having a substantially plane bottom wall provided in its lower face with an annular groove semicircular in radial section and a corresponding annular protuberance on its upper face, and a heating element circular in radial cross section disposed in said groove to be located partially above and partially below the plane of the bottom wall of the vessel.

4. In a beverage brewer as set forth in claim 3, a heating element circular in radial section and of a diameter to make contact with the surface of the groove throughout substantially the 180° thereof.

References Cited in the file of this patent

UNITED STATES PATENTS

| Number | Name | Date |
|---|---|---|
| 1,318,168 | Newson | Oct. 7, 1919 |
| 1,905,111 | Lamb | Apr. 25, 1933 |
| 1,994,323 | Peirce | Mar. 12, 1935 |
| 2,194,820 | Connell et al. | Mar. 26, 1940 |
| 2,212,100 | Keaton | Aug. 20, 1940 |
| 2,223,450 | Jepson et al. | Dec. 3, 1940 |
| 2,262,286 | Ireland | Nov. 11, 1941 |
| 2,287,583 | Weeks | June 23, 1942 |
| 2,329,116 | Heilman | Sept. 7, 1943 |
| 2,356,784 | Graham | Aug. 29, 1944 |
| 2,365,615 | Woodman | Dec. 19, 1944 |
| 2,504,728 | Purpura | Apr. 18, 1950 |
| 2,576,432 | Wilcox | Nov. 27, 1951 |
| 2,651,707 | Jepson | Sept. 8, 1953 |